(12) United States Patent
Lien

(10) Patent No.: US 11,334,313 B1
(45) Date of Patent: May 17, 2022

(54) MANAGING CONFERENCES IN VIRTUAL ENVIRONMENT

(71) Applicant: HTC Corporation, Taoyuan (TW)

(72) Inventor: Kuan-Yi Lien, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/216,706

(22) Filed: Mar. 30, 2021

(51) Int. Cl.
*G06F 3/16* (2006.01)
*G06F 3/04815* (2022.01)
*G06F 3/04845* (2022.01)

(52) U.S. Cl.
CPC .......... *G06F 3/165* (2013.01); *G06F 3/04815* (2013.01); *G06F 3/04845* (2013.01)

(58) Field of Classification Search
None
See application file for complete search history.

(56) References Cited

U.S. PATENT DOCUMENTS

| | | | | |
|---|---|---|---|---|
| 5,999,208 A * | 12/1999 | McNerney | ............... | H04N 7/15 348/14.03 |
| 9,338,404 B1 * | 5/2016 | Egeler | .................... | H04N 7/157 |
| 9,787,631 B2 * | 10/2017 | Zilmer | .................... | H04L 51/36 |
| 2009/0216835 A1 * | 8/2009 | Jain | ......................... | G06Q 10/10 709/204 |
| 2017/0300502 A1 * | 10/2017 | Fogelson | ............ | G06F 16/9038 |
| 2017/0332047 A1 * | 11/2017 | Abraham | ................ | H04L 51/32 |
| 2019/0098255 A1 | 3/2019 | Bergmann et al. | | |
| 2020/0329214 A1 * | 10/2020 | Ahn | ........................ | G06F 30/20 |

FOREIGN PATENT DOCUMENTS

| | | |
|---|---|---|
| CN | 104756056 A | 7/2015 |
| CN | 204721476 U | 10/2015 |
| TW | 201337711 A | 9/2013 |

\* cited by examiner

*Primary Examiner* — Mandrita Brahmachari
(74) *Attorney, Agent, or Firm* — CKC & Partners Co., LLC

(57) ABSTRACT

A method for managing virtual environment, which includes the following operations: controlling an audio-visual device to display a virtual environment, in which the virtual environment includes multiple virtual characters, and the multiple virtual characters include a first virtual character corresponding to the audio-visual device; in response to a grouping signal, grouping the multiple virtual characters into multiple virtual groups at different locations in the virtual environment, in which the multiple virtual groups include a first virtual group including the first virtual character; in response to a first selecting signal, controlling the audio-visual device to stop playing audio of one or more of the multiple virtual groups other than the first virtual group.

20 Claims, 6 Drawing Sheets

MANAGING CONFERENCES IN VIRTUAL ENVIRONMENT

BACKGROUND

Technical Field

The present disclosure relates to a method for managing a virtual environment and a computing circuit and a non-transitory computer readable media for performing the method. More particularly, the present disclosure relates to a method for managing a virtual environment and suitable for a workshop session and a computing circuit and a non-transitory computer readable media for performing the method.

Description of Related Art

Virtual reality (VR) technology uses a computer to simulate a fully immersive three-dimensional virtual world. Augmented reality (AR) technology is not completely immersive, but superimposes virtual objects on real images. As long as the user wears a device that utilizes the above-mentioned technologies, the user can experience various immersive scenes. These technologies can be used not only for gaming and entertainment, but also as practical production tools. For example, a virtual meeting is not limited by the location and can break the boundary between virtual and real, shorten the distance between participants and improve communication efficiency. With the continuous development of global business activities, the frequency of holding multinational virtual conferences is continuously increasing.

SUMMARY

The disclosure provides a method for managing a virtual environment. The method includes the following operations: controlling an audio-visual device to display a virtual environment, wherein the virtual environment includes a plurality of virtual characters, and the plurality of virtual characters include a first virtual character corresponding to the audio-visual device; in response to a grouping signal, grouping the plurality of virtual characters into a plurality of virtual groups locating at different locations of the virtual environment, wherein the plurality of virtual groups include a first virtual group, and the first virtual group includes the first virtual character; and in response to a first select signal, controlling the audio-visual device to stop playing sounds of one or more of the plurality of virtual groups other than the first virtual group.

The disclosure provides a computing circuit suitable for an audio-visual device. The computing circuit is configured to: control the audio-visual device to display a virtual environment, wherein the virtual environment includes a plurality of virtual characters, and the plurality of virtual characters include a first virtual character corresponding to the audio-visual device; in response to a grouping signal, group the plurality of virtual characters into a plurality of virtual groups locating at different locations of the virtual environment, wherein the plurality of virtual groups include a first virtual group, and the first virtual group includes the first virtual character; and in response to a first select signal, control the audio-visual device to stop playing sounds of one or more of the plurality of virtual groups other than the first virtual group.

The disclosure provides a non-transitory computer readable media including one or more computer executable instructions. When a computing circuit of an audio-visual device executes the one or more computer executable instructions, the one or more computer executable instructions causing the computing circuit to perform: controlling an audio-visual device to display a virtual environment, wherein the virtual environment includes a plurality of virtual characters, the plurality of virtual characters include a first virtual character corresponding to the audio-visual device; in response to a grouping signal, grouping the plurality of virtual characters into a plurality of virtual groups locating at different locations of the virtual environment, wherein the plurality of virtual groups include a first virtual group, and the first virtual group includes the first virtual character; and in response to a first select signal, controlling the audio-visual device to stop playing sounds of one or more of the plurality of virtual groups other than the first virtual group.

One of the advantages of the aforesaid embodiments is to boost meeting efficiency by helping the user to filter out disturbances caused by the discussion of other groups.

Another advantage of the aforesaid embodiments is to facilitate the user to join the discussion of other groups to increase creativity.

DETAILED DESCRIPTION

Figure 1:
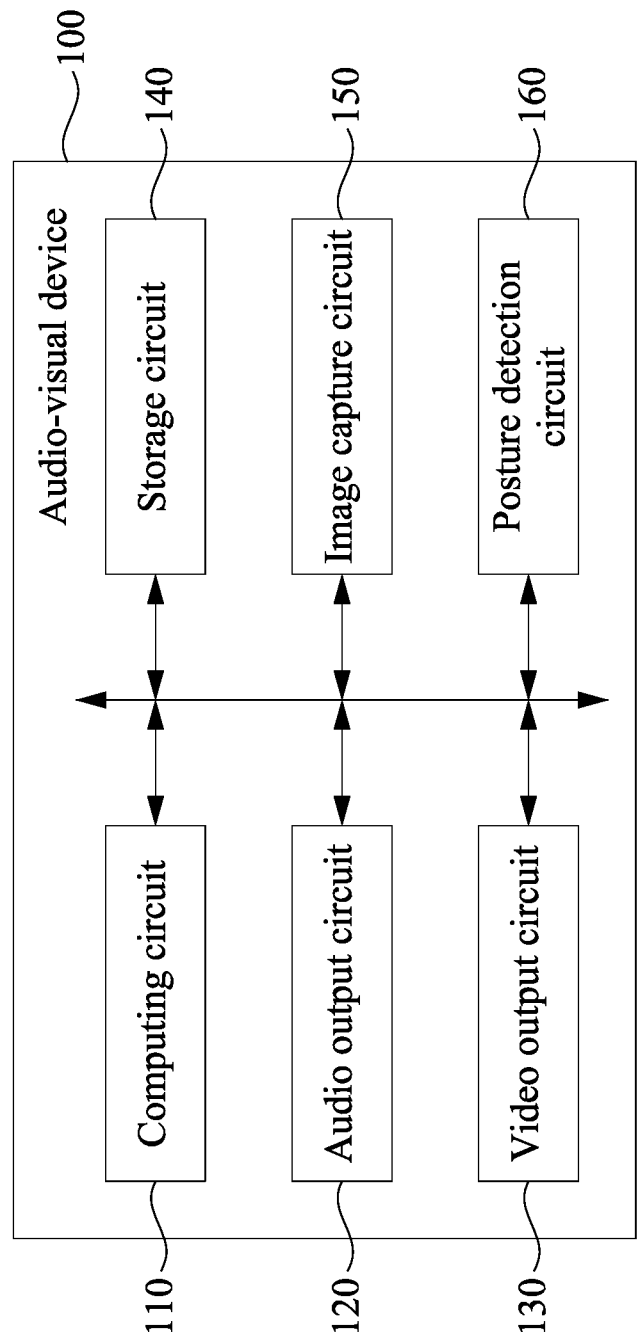
FIG. 1 is a simplified functional block diagram of an audio-visual device 100 according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified functional block diagram of an audio-visual device 100 according to one embodiment of the present disclosure. The audio-visual device 100 comprises a computing circuit 110, and comprises an audio output circuit 120, a video output circuit 130, and a storage circuit 140 that are coupled with the computing circuit 110. In some embodiments, the audio-visual device 100 may further comprise an image capture circuit 150 and a posture detection circuit 160 that are coupled with the computing circuit 110. The audio-visual device 100 is configured to provide immersive experiences such as virtual reality or augmented reality. In some embodiments, the computing circuit 110 may output video data and audio data to the video output circuit 130 and the audio output circuit 120, respectively. In some embodiments, the video output circuit 130 may be realized by dual displays corresponding to left and right eyes of a user or by a single display that can simultaneously display the left-eye image and the right-eye image, so as to generate a three dimensional (3D) virtual environment. In other embodiments, the audio output circuit 120 can be realized by suitable speaker elements that can play corresponding sound effects.

In some embodiments, the audio-visual device 100 may be realized by a head-mounted device. In other embodiments, the computing circuit 110 may be realized by the central processing unit (CPU), graphic processing unit (GPU), or a combination of other logic circuits having computing capability. Notably, the computing circuit 110 may be disposed external to the audio-visual device 100, and may be communicatively coupled with the audio-visual device 100 by wire or wireless means. For example, the computing circuit 110 may be realized by a smart phone, a tablet, a personal computer, or a laptop.

In some embodiments, the image capture circuit 150 may comprise one or more camera units (not shown). The image capture circuit 150 may be configured to capture external images, including images of hands of a user or images of a hand-held controller, so that the computing circuit 110 can recognize gestures or moving trajectories of the hand-held controller. The computing circuit 110 may adjust contents of the virtual environment according to recognition results to enable interaction between the user and the virtual environment. In other embodiments, the external images captured by the image capture circuit 150 can be used to calculate moving trajectories of the audio-visual device 100.

In some embodiments, the posture detection circuit 160 comprises a gravity sensor and/or a gyroscope to detect a tilt angle and a rotation angle of the audio-visual device 100 to represent a tilt angle and a rotation angle of the user, respectively. The computing circuit 110 may control the virtual environment according to detection results of the posture detection circuit 160 to render the virtual environment to rotate, tilt or move in correspond to body movements of the user, in order to provide immersive experience to the user.

Figure 2:
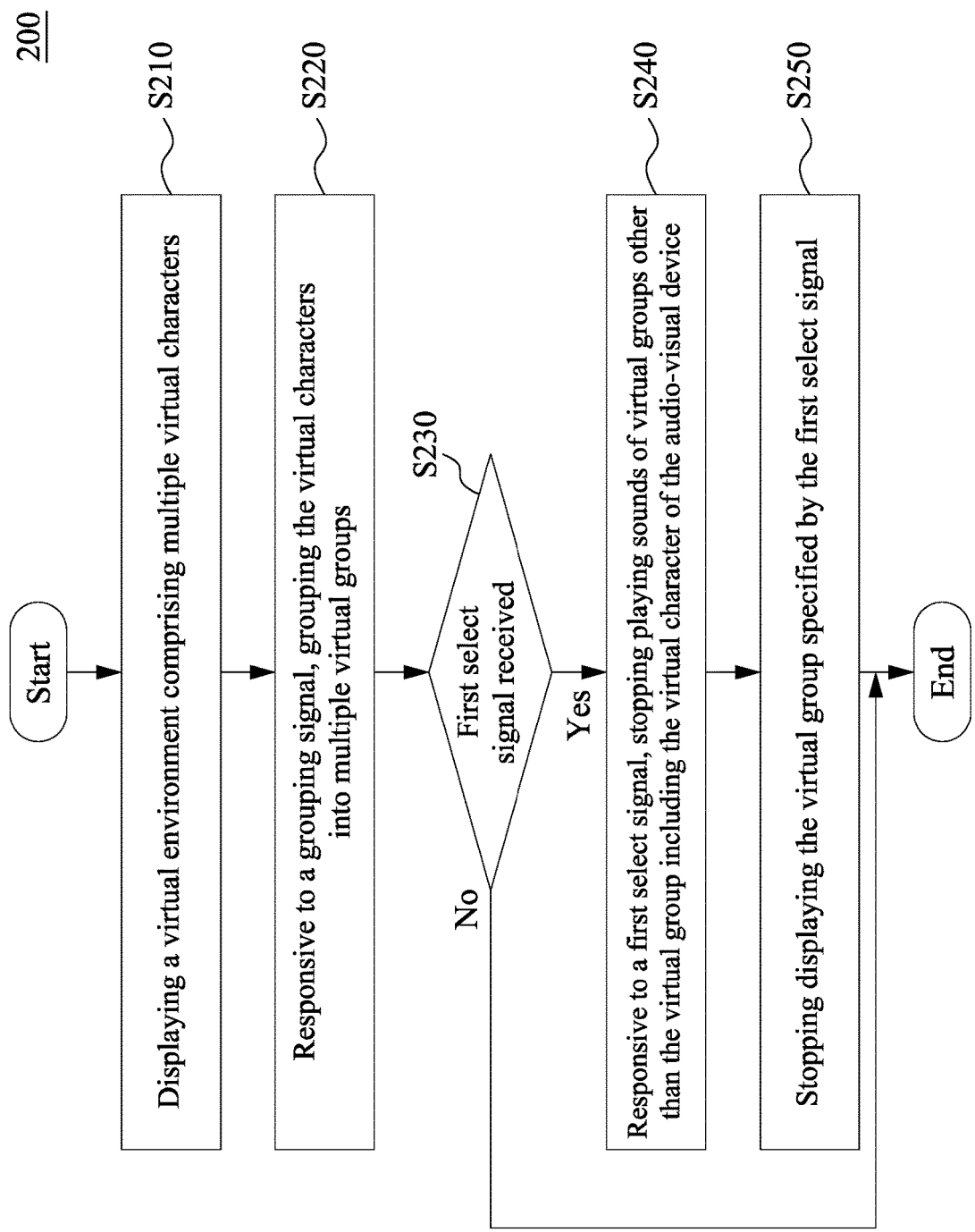
FIG. 2 is a flowchart of a method for managing a virtual environment according to one embodiment of the present disclosure.

In some embodiments, the storage circuit 140 stores one or more computer readable instructions. When the computing circuit 110 executes the computer readable instructions, the computer readable instructions cause the computing circuit 110 to perform a method 200 for managing the virtual environment as shown in FIG. 2.

Figure 3:
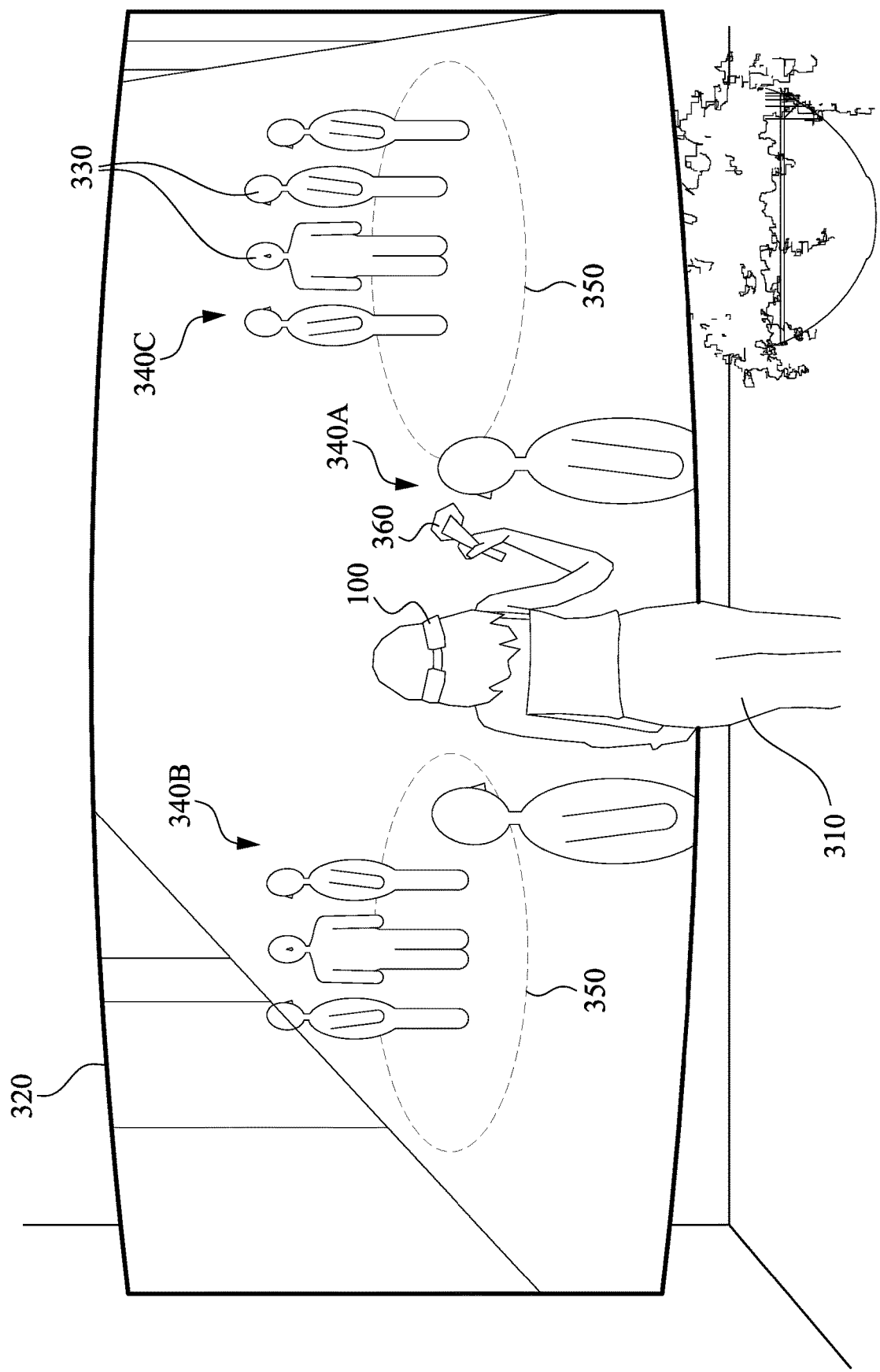
FIG. 3 is an exemplary virtual environment seen by a user when the user uses the audio-visual device.

FIG. 3 is an exemplary virtual environment 320 seen by a user 310 when the user 310 uses the audio-visual device 100. Reference is made to FIG. 2 and FIG. 3. In operation S210, the computing circuit 110 controls the video output circuit 130 to display the virtual environment 320. The virtual environment 320 comprises a plurality of virtual characters 330. The virtual characters 330 comprise a virtual character 330 corresponding to the audio-visual device 100, and comprise other virtual characters 330 (not all shown in FIG. 3) corresponding to other audio-visual devices. In some embodiments, the virtual character 330 corresponding to the audio-visual device 100 is the virtual character 330 operated by the user 310. The virtual environment 320 is drawn based on a viewing angle of the user 310 of the audio-visual device 100, and thus the virtual character 330 corresponding to the audio-visual device 100 are not shown in FIG. 3. In some embodiments, relative position relationships between the virtual characters 330 in FIG. 3 and the user 310 are corresponding to relative position relationships between the virtual characters 330 and the virtual character 330 corresponding to the audio-visual device 100.

In operation S220, in response to a grouping signal, the virtual characters 330 are grouped into a plurality of virtual groups 340A-340C for virtual group activities, such as a workshop session, wherein the virtual group 340A comprises the virtual character 330 corresponding to the audio-visual device 100. In some embodiments, the aforesaid "grouping" is to assign the virtual characters 330 in to a plurality of areas 350, in which virtual characters 330 in the same area 350 belongs the same virtual group. In some embodiments, the user 310 is a meeting host, and the grouping signal may be generated and communicatively transmitted by a hand-held controller 360 to the audio-visual device 100 when the user 310 conducts a specific operation to the hand-held controller 360. As a result, the user 310 can take the initiative to group the virtual characters 330 in the virtual environment 320.

In another embodiment, the grouping signal is generated and communicatively transmitted by a central control platform (not shown) to the audio-visual device 100, in which the audio-visual device 100 is different from the central control platform. The audio-visual device 100 correspondingly adjusts contents of the virtual environment 320 based on the grouping signal. The central control platform can be a head-mounted device a personal computer, a laptop, a tablet, or a smart phone of the meeting host. In some embodiments, the central control platform corresponding to one of the virtual characters 330, that is, the grouping signal can be generated by a personal computer, a laptop, a tablet, or a smart phone of any one of the virtual characters 330. In FIG. 2, grouping the virtual characters 330 in to three virtual groups 340A-340C are merely an exemplary embodiment and this disclosure is not limited thereto. The virtual characters 330 may be grouped into more than two virtual groups based on practical requirements.

In some embodiments, the user 310 of the audio-visual device 100 may be late to participate the virtual grouping session, and thus when the audio-visual device 100 displays the virtual environment 320, the virtual environment 320 already comprises the virtual groups 340A-340C. In this case, the audio-visual device 100 may assign, be assigned, or be arbitrarily assigned to a virtual group to join the session. For example, the user 310 may use the hand-held controller 360 to point to an the area 350 at which a specified one of the virtual groups 340A-340C is located, and the user 310 may apply a button operation to the hand-held controller 360 to render the audio-visual device 100 to move (join) the virtual character 330 corresponding to the audio-visual device 100 into the specified one of the virtual groups 340A-340C.

Reference is made to FIG. 2, the computing circuit 110 determines whether receives a first select signal in operation S230. If so, the computing circuit 110 then conducts operations S240-S250. If not, the computing circuit 110 proceeds to operation S230.

In operation S240, in response to the first select signal, the computing circuit 110 controls the audio output circuit 120 to stop playing sounds of one or more virtual groups other than the virtual group 340A. That is, except for the virtual group 340A includes the virtual character 330 corresponding to the audio-visual device 100, one or more of the virtual groups 340B-340C is muted. In other embodiments, except for the virtual group 340A including the virtual character 330 corresponding to the audio-visual device 100, the other virtual groups are all muted. In some embodiments, the first select signal is generated by the hand-held controller 360 when the user 310 applies a specific button operation to the hand-held controller 360 or generated by the image capture circuit 150 according to a specific gesture of the user 310. The user 310 may specify, by the first select signal, one or more of the virtual groups 340B-340C to mute the specified virtual groups. For example, the user 310 may use the hand-held controller 360 or the gesture to point to the area 350 at which the virtual group 340B is located or to point to one virtual character 330 in the virtual group 340B, and then the audio output circuit 120 stops to play sounds of the virtual group 340B.

In other embodiments, the first select signal is generated and communicatively transmitted by the central control platform to the audio-visual device 100, and the computing circuit 110 controls the audio output circuit 120, according to the first select signal, to stop broadcasting sounds of the virtual group specified by the first select signal or sounds of all virtual groups other than the virtual group that the audio-visual device 100 participates.

In some embodiments, the audio-visual device 100 may terminate the method 200 after operation S240 is finish. In other embodiments, the audio-visual device 100 may conduct operation S250 after operation S240 is finished. In operation S250, the computing circuit 110 controls the video output circuit 130 stops to display the virtual group specified by the first select signal. For example, if the first select signal specifies the virtual group 340B, the audio-visual device 100 mutes and stops to display the virtual groups 340B, while the user 310 of the audio-visual device 100 can still see the virtual group 340C. In some embodiments, the term "stops to display" means that the computing circuit 110 configures the virtual characters 330 in the virtual group specified by the first select signal to be transparent, or means that the computing circuit 110 configures the virtual characters 330 as well as the scenes of the specified virtual group to be transparent. In other embodiments, the term "stops to display" means that the computing circuit 110 covers or blocks the virtual characters 330 and scenes in the virtual group specified by the first select signal.

The execution order of operations in FIG. 2 is merely an example, rather than a restriction to practical implementations. In some embodiments, operations S230-S250 may be conducted for multiple times to reconfiguration the one or more virtual groups that are muted and/or not displayed. In other embodiments, operation S240 or S250 can be omitted.

In some embodiments, the audio-visual device 100 may response to a second select signal to stop broadcasting the sounds of the virtual group 340A including the virtual character 330 corresponding to the audio-visual device 100 to other virtual groups 340B-340C, to facilitate members of the virtual group 340A to discuss in private. In other embodiments, the audio-visual device 100 may response to a third select signal to disable the mute state of a virtual group or to re-display a virtual group that is previously stopped displaying. The audio-visual device 100 may response to a fourth select signal to re-broadcast the sounds of the virtual group 340A including the virtual character 330 corresponding to the audio-visual device 100 to other virtual groups 340B-340C. The second select signal, the third select signal, and the fourth select signal may be generate by the hand-held controller 360 when the user 310 applies a specific button operation to the hand-held controller 360, generated by the image capture circuit 150 according to gestures of the user 310, or generated by the central control platform and communicatively transmitted to the audio-visual device 100.

In a workshop session or brainstorming session held in the form of various groups, the discussion of one group may be disturbed by sounds and body languages of other groups. Accordingly, the method 200 for managing the virtual environment helps the user 310 to filter out disturbances of sounds and images of other groups and further ensures the privacy of his/her own group, so as to boost meeting efficiency.

Figure 4:
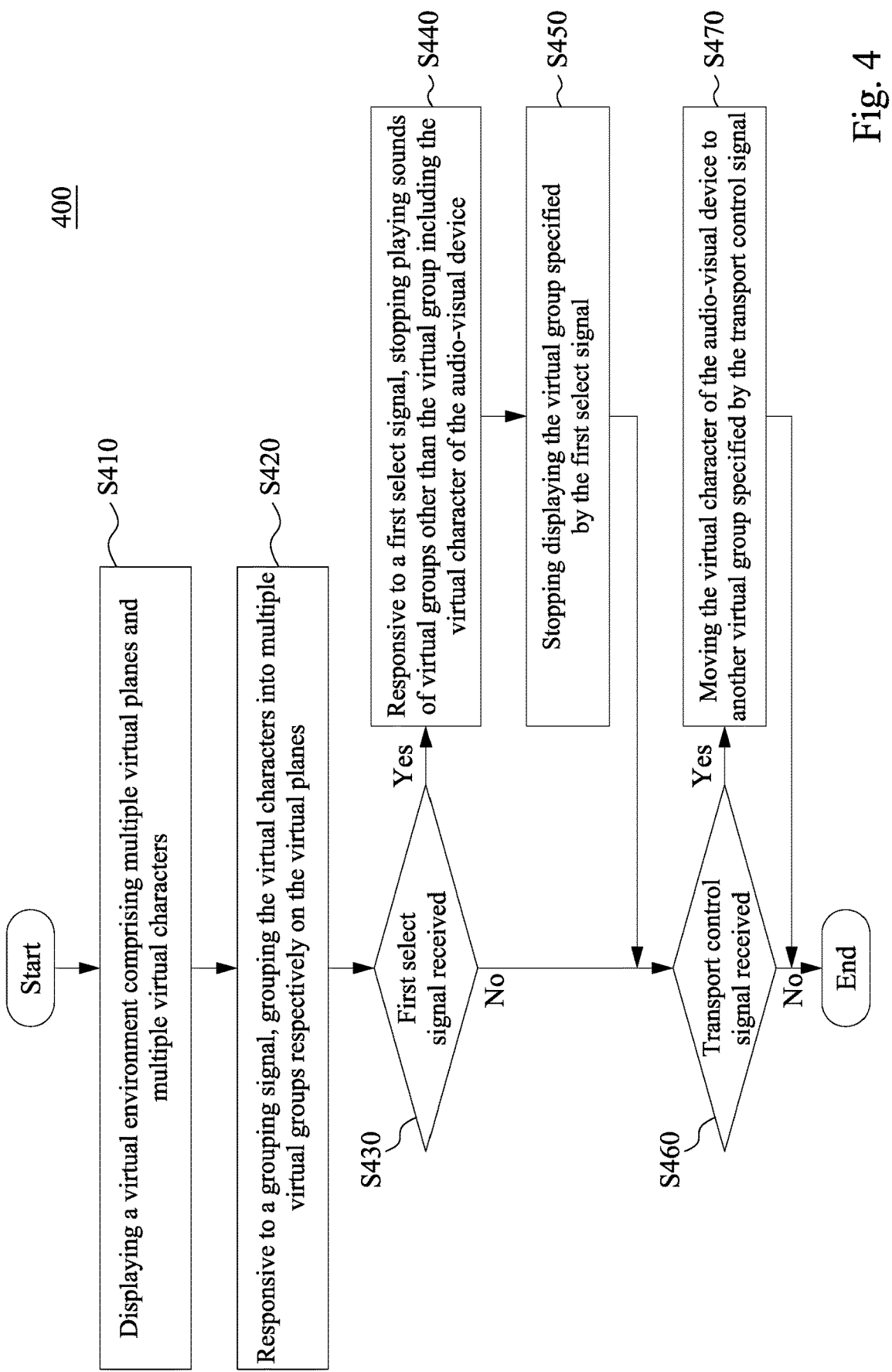
FIG. 4 is a flowchart of a method for managing a virtual environment according to one embodiment of the present disclosure.
Figure 5A:
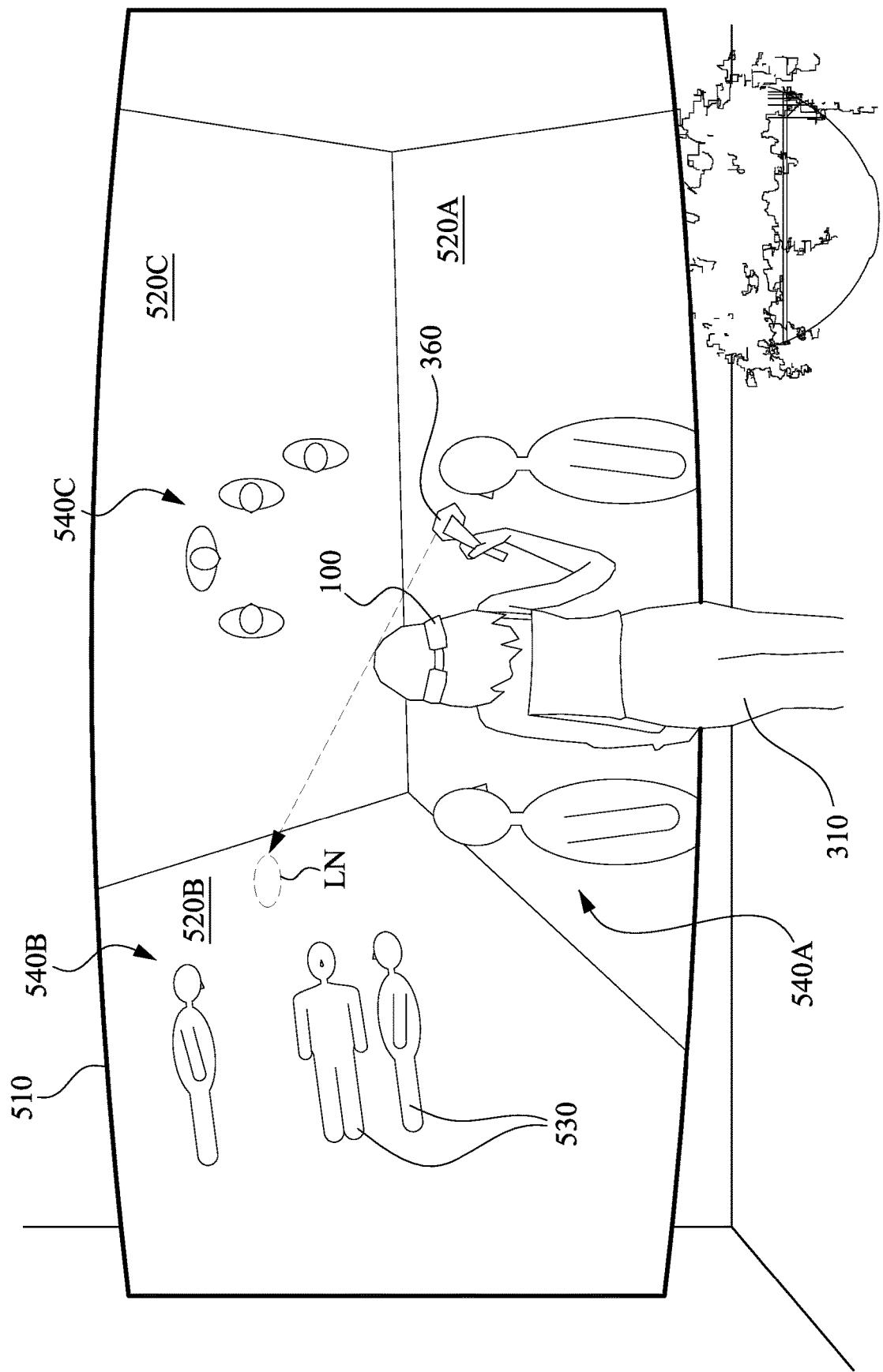
FIG. 5A shows an exemplary virtual environment seen by the user when the user uses the audio-visual device.
Figure 5B:
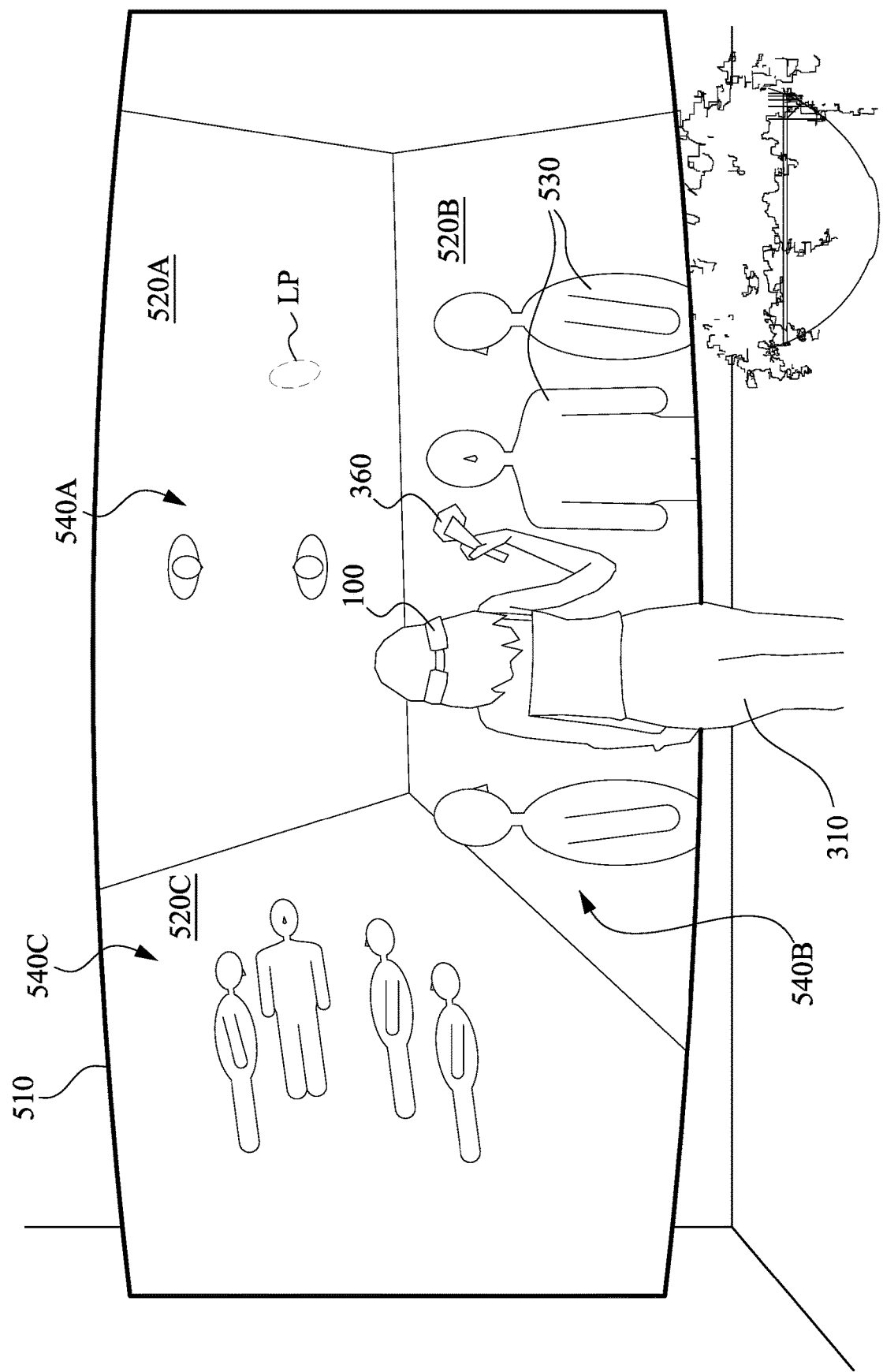
FIG. 5B shows another exemplary virtual environment seen by the user when the user uses the audio-visual device.

In some embodiments, when the computing circuit 110 executes the one or more computer readable instructions in the storage circuit 140, the computer readable instructions cause the computing circuit 110 to perform a method 400 for managing the virtual environment as shown in FIG. 4. FIGS. 5A-5B each show an exemplary virtual environment 510 seen by the user 310 when the user 310 uses the audio-visual device 100.

Reference is made to FIG. 4 and FIG. 5A. In operation S410, the computing circuit 110 controls the audio-visual device 100 to display an virtual environment 510. The virtual environment 510 comprises a plurality of virtual planes 520A-520C and a plurality of virtual characters 530. In some embodiments, the virtual characters 530 are on the same virtual plane in operation S410. In some embodiments, the virtual characters 530 may be arbitrarily distributed on different virtual planes in operation S410.

In some embodiments, two of the virtual planes 520A-520C that are adjacent are not parallel with each other. For example, the virtual environment 510 may be an inner space of a polyhedron and the virtual planes 520A-520C are faces of the inner space of the polyhedron, but this disclosure is not limited thereto. In some embodiments, two of the virtual planes 520A-520C that are adjacent are parallel with each other. For example, the two adjacent virtual planes may be different in shapes or sizes but are parallel with each other.

In operation S420, in response to the grouping signal, the audio-visual device 100 groups the virtual characters 530 into a plurality of virtual groups 540A-540C, in which the virtual groups 540A-540C are located on virtual planes 520A-520C, respectively. That is, the term "grouping" means that to assign the virtual characters 530 to the virtual planes 520A-520C, and the virtual characters 530 on the same virtual plane belong to the same virtual group. Since the virtual environment 510 is drawn based on the view angle of the user 310 of the audio-visual device 100, the virtual character 530 corresponding to the audio-visual device 100 are not shown in FIG. 5A.

In some embodiments, the user 310 of the audio-visual device 100 may be late to participate the virtual grouping session, and thus when the audio-visual device 100 displays the virtual environment 510, the virtual environment 510 already comprises the virtual groups 540A-540C. In this case, the user 310 of the audio-visual device 100 is free to select an interest virtual group to join the discussion. For example, the user 310 may use the hand-held controller 360 to point to a virtual plane on which one of the virtual groups 540A-540C is located and may apply a button operation to the hand-held controller 360, so that the audio-visual device 100 moves (joins) the virtual character 530 corresponding to the audio-visual device 100 into the one of the virtual groups 540A-540C. When the user 310 inputs the interest group into the audio-visual device 100, the computing circuit 110 conducts operation S420 to set the virtual character 530 of the audio-visual device 100 in the virtual environment 510 to a virtual position of the interest virtual group that the user 310 wants to join. In the embodiment of FIG. 5A, the interest group is the virtual group 540A, and thus the virtual character 530 of the audio-visual device 100 is set to a virtual position of the virtual group 540A, that is, the virtual character 530 of the user 310 is set to be on the virtual plane 520A.

In some embodiments, the computing circuit 110 defines a plurality of virtual force vectors (e.g., virtual gravity) in the virtual environment 510. The virtual force vectors are substantially perpendicular to the virtual planes 520A-520C, respectively, in which the computing circuit 110 manipulates the virtual groups 540A-540C according to the virtual force vectors, respectively. For example, the computing circuit 110 decides the directions of movement of the virtual characters 530 in the virtual groups 540A-540C according to the virtual force vectors, respectively. As a result, the virtual groups 540A-540C can stay (stand) on the virtual planes 520A-520C without skew or fall.

Then, the computing circuit 110 determines whether the first select signal is received in operation S430. If so, the computing circuit 110 conducts operations S440-S450.

In operation S460, the computing circuit 110 determines whether the transport control signal is received, in which the transport control signal is used to specify another virtual group that the user 310 wants to join. If the transport control signal is received, the computing circuit 110 then conducts operation S470 to move the virtual character 530 corresponding to the audio-visual device 100 to another virtual group specified by the transport control signal. If the transport control signal is not received, the computing circuit 110 may keep waiting the reception of the transport control signal, but this disclosure is not limited thereto.

In some embodiments, as shown in FIG. 5A, the transport control signal is generated and transmitted by the hand-held controller 360 to the audio-visual device 100 when the user 310 points one of the virtual planes 520B-520C by the hand-held controller 360. In other embodiments, the transport control signal may be image data transmitted by the image capture circuit 150 to the computing circuit 110, in which the image data comprises a specific gesture of the user 310 pointing to one of the virtual planes 520B-520C. Accordingly, the computing circuit 110 determines the virtual plane to which the user points according to the transport control signal, and moves the virtual character 530 corresponding to the audio-visual device 100 to the virtual plane specified by the user 310 to join another virtual group.

In this embodiment, the hand-held controller 360 points to the virtual plane 520B and generates the transport control signal. As a result, the computing circuit 110 moves the virtual character 530 corresponding to the audio-visual device 100 to the virtual plane 520B to join the virtual group 540B. For example, the computing circuit 110 moves the virtual character 530 corresponding to the audio-visual device 100 to a virtual position LN pointed by the hand-held controller 360 or to an arbitrary coordinate point on the virtual plane 520B.

FIG. 5B shows a virtual environment 510 seen by the user 310 after the virtual character 530 corresponding to the audio-visual device 100 is moved to the virtual position LN. The virtual position LP represents an original position of the virtual character 530 corresponding to the audio-visual device 100 before operation S470. As shown in FIG. 5B, in operation S470, the virtual plane 520B is adjusted to be substantially parallel with a view direction of the audio-visual device 100, and the entire virtual environment 510 is correspondingly rotated to remain the relative position relationship between the virtual planes 520A-520C. In some embodiments, the term "view direction" means a direction that the user 310 looks straight forward. In other embodiments, the audio-visual device 100 may determine the view direction of the audio-visual device 100 according to a posture detection signal (e.g., a gravity sensing signal) generated by the posture detection circuit 160, but this disclosure is not limited thereto.

The execution order of operations in FIG. 4 is merely an example, rather than a restriction to practical implementations. In some embodiments, operations S430-S450 may be executed for multiple times to reconfiguration the one or more virtual groups that are muted and/or not displayed. In other embodiments, operation S440 or S450 can be omitted. In some embodiments, operations S460 and S470 may be executed for multiple times to enable the user 310 to move the virtual character 530 thereof between different virtual groups. In some embodiments, when operations S460 and S470 are finished, operations S430-S450 may be executed again to mute or not display different virtual groups. In addition, details of operations S410-S450 are described in the embodiment of FIG. 2. For the sake of brevity, those descriptions are omitted.

In a workshop session or brainstorming session held in the form of various groups, participants may draw inspiration from discussion of other groups. The method 400 for managing the virtual environment locates the virtual groups 540A-540C on different planes in a three-dimensional space, facilitating the user 310 to observe the discussion state of multiple groups. The method 400 also allows the user 310 to join the discussion of other groups freely, improving the efficiency and creativity of the meeting.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method for managing a virtual environment, comprising:
   controlling an audio-visual device to display a virtual environment, wherein the virtual environment comprises a plurality of virtual characters, and the plurality of virtual characters comprise a first virtual character corresponding to the audio-visual device;
   in response to a grouping signal, grouping the plurality of virtual characters into a plurality of virtual groups locating at different locations of the virtual environment, wherein the plurality of virtual groups comprise a first virtual group, and the first virtual group comprises the first virtual character; and in response to a first select signal, controlling the audio-visual device to stop playing sounds of one or more of the plurality of virtual groups other than the first virtual group, wherein the virtual environment comprises a plurality of virtual planes, and the plurality of virtual groups are on the plurality of virtual planes, respectively.

2. The method of claim 1, further comprising:
in response to the first select signal, controlling the audio-visual device to stop displaying, in the virtual environment, the one or more of the plurality of virtual groups other than the first virtual group.

3. The method of claim 1, wherein two adjacent virtual planes of the plurality of virtual planes are parallel with each other.

4. The method of claim 1, wherein two adjacent virtual planes of the plurality of virtual planes are not parallel with each other.

5. The method of claim 4, wherein the audio-visual device displays the first virtual group and a second virtual group of the plurality of virtual groups on a first virtual plane and a second virtual plane of the plurality of virtual planes, respectively, and the method further comprises:
defining a first virtual force vector and a second virtual force vector perpendicular to the first virtual plane and the second virtual plane, respectively; and
manipulating the first virtual group to stay on the first virtual plane according to the first virtual force vector, and manipulating the second virtual group to stay on the second virtual plane according to the second virtual force vector.

6. The method of claim 4, further comprising:
in response to a transport control signal, moving the first virtual character corresponding to the audio-visual device from the first virtual group to a third virtual group of the plurality of virtual groups, wherein the third virtual group is the same or different from the second virtual group.

7. The method of claim 6, wherein moving the first virtual character corresponding to the audio-visual device from the first virtual group to the third virtual group comprising:
adjusting a third virtual plane of the plurality of virtual planes, on which the third virtual group is located, to be parallel with a view direction of the audio-visual device.

8. The method of claim 1, further comprising:
in response to a second select signal, stopping to play sounds of the first virtual group to virtual groups of the plurality of virtual groups other than the first virtual group.

9. The method of claim 1, further comprising:
in response to a third select signal, controlling the audio-visual device to restart to play the sounds of the one or more of the plurality of virtual groups other than the first virtual group.

10. The method of claim 9, wherein the first select signal and the third select signal are received from a central control platform.

11. A computing circuit, suitable for an audio-visual device, and the computing circuit is configured to:
control the audio-visual device to display a virtual environment, wherein the virtual environment comprises a plurality of virtual characters, and the plurality of virtual characters comprise a first virtual character corresponding to the audio-visual device;
in response to a grouping signal, group the plurality of virtual characters into a plurality of virtual groups locating at different locations of the virtual environment, wherein the plurality of virtual groups comprise a first virtual group, and the first virtual group comprises the first virtual character; and
in response to a first select signal, control the audio-visual device to stop playing sounds of one or more of the plurality of virtual groups other than the first virtual group, wherein the virtual environment comprises a plurality of virtual planes, and the plurality of virtual groups are on the plurality of virtual planes, respectively.

12. The computing circuit of claim 11, wherein the computing circuit is further configured to:
in response to the first select signal, control the audio-visual device to stop displaying, in the virtual environment, the one or more of the plurality of virtual groups other than the first virtual group.

13. The computing circuit of claim 11, wherein two adjacent virtual planes of the plurality of virtual planes are parallel with each other.

14. The computing circuit of claim 11, wherein two adjacent virtual planes of the plurality of virtual planes are not parallel with each other.

15. The computing circuit of claim 14, wherein the computing circuit is further configured to:
in response to a transport control signal, move the first virtual character corresponding to the audio-visual device from the first virtual group to a third virtual group of the plurality of virtual groups.

16. The computing circuit of claim 15, wherein when the computing circuit moves the first virtual character corresponding to the audio-visual device from the first virtual group to the third virtual group, the computing circuit is further configured to:
adjust a third virtual plane of the plurality of virtual planes, on which the third virtual group is located, to be parallel with a view direction of the audio-visual device.

17. The computing circuit of claim 11, wherein the computing circuit is further configured to:
in response to a second select signal, control the audio-visual device to stop broadcasting sounds of the first virtual group to virtual groups of the plurality of virtual groups other than the first virtual group.

18. The computing circuit of claim 11, wherein the computing circuit is further configured to:
in response to a third select signal, control the audio-visual device to restart to play the sounds of the one or more of the plurality of virtual groups other than the first virtual group.

19. The computing circuit of claim 18, wherein the first select signal and the third select signal are received from a central control platform.

20. A non-transitory computer readable media, comprising one or more computer executable instructions, wherein when a computing circuit of an audio-visual device executes the one or more computer executable instructions, the one or more computer executable instructions causing the computing circuit to perform:
controlling an audio-visual device to display a virtual environment, wherein the virtual environment comprises a plurality of virtual characters, the plurality of virtual characters comprise a first virtual character corresponding to the audio-visual device;
in response to a grouping signal, grouping the plurality of virtual characters into a plurality of virtual groups locating at different locations of the virtual environment, wherein the plurality of virtual groups comprise a first virtual group, and the first virtual group comprises the first virtual character; and in response to a first select signal, controlling the audio-visual device to stop playing sounds of one or more of the plurality of virtual groups other than the first virtual group, wherein the virtual environment comprises a plurality of virtual planes, and the plurality of virtual groups are on the plurality of virtual planes, respectively.

\* \* \* \* \*